US012573541B2

(12) United States Patent
Bühlmaier et al.

(10) Patent No.: US 12,573,541 B2
(45) Date of Patent: Mar. 10, 2026

(54) COIL AND METHOD OF MANUFACTURING THE COIL

(71) Applicant: TDK Electronics AG, Munich (DE)

(72) Inventors: Stephan Bühlmaier, Langenau (DE); Anneliese Drespling, Heidenheim (DE); Felipe Jerez Galdeano, Thalfingen-Elchingen (DE); Joachim Sorg, Schwäbisch Gmünd (DE); Herbert Lux, Heidenheim (DE); Gerhard Proks, Steinheim (DE)

(73) Assignee: TDK Electronics AG, Munich (DE)

( * ) Notice: Subject to any disclaimer, the term of this patent is extended or adjusted under 35 U.S.C. 154(b) by 779 days.

(21) Appl. No.: 17/637,323

(22) PCT Filed: Apr. 7, 2021

(86) PCT No.: PCT/EP2021/059038
§ 371 (c)(1),
(2) Date: Feb. 22, 2022

(87) PCT Pub. No.: WO2021/213801
PCT Pub. Date: Oct. 28, 2021

(65) Prior Publication Data

US 2022/0277887 A1 Sep. 1, 2022

(30) Foreign Application Priority Data

Apr. 21, 2020 (DE) ........................ 102020110850.8

(51) Int. Cl.
*H01F 27/29* (2006.01)
*H01F 27/02* (2006.01)
*H01F 41/10* (2006.01)

(52) U.S. Cl.
CPC ............ *H01F 27/29* (2013.01); *H01F 27/02* (2013.01); *H01F 41/10* (2013.01)

(58) Field of Classification Search
CPC .......... H01F 27/29; H01F 27/02; H01F 27/22; H01F 17/04; H01F 27/292;
(Continued)

(56) References Cited

U.S. PATENT DOCUMENTS 5,428,337 A * 6/1995 Vinclarelli ........... H01F 41/071 336/83
6,940,387 B2 9/2005 Shibata et al.
(Continued)

FOREIGN PATENT DOCUMENTS

CN 1372272 A 10/2002
DE 102012011554 A1 12/2013
(Continued)

*Primary Examiner* — Mang Tin Bik Lian
(74) *Attorney, Agent, or Firm* — Slater Matsil, LLP

(57) ABSTRACT

In an embodiment a coil includes a tube having a tube wall of an electrically conductive material, wherein the tube has an inductive portion in which a gap is arranged in the tube wall which shapes the tube wall in the inductive portion to form a helix, wherein the tube has at least one contact section including a connection region and at least one terminal region, wherein the connection region has the same contour as an adjacent portion of the helix, wherein the terminal region is an electrical terminal of the coil, and wherein the connection region electrically connects the terminal region to the inductive portion.

23 Claims, 6 Drawing Sheets

(58) Field of Classification Search
CPC ....... H01F 2017/048; H01F 2017/0033; H01F 27/2828; H01F 27/2852
See application file for complete search history.

(56) References Cited

U.S. PATENT DOCUMENTS

| | | | | |
|---|---|---|---|---|
| 9,468,750 | B2 * | 10/2016 | Kondabatni | A61N 1/05 |
| 10,699,836 | B2 * | 6/2020 | Schekulin | H01F 41/00 |
| 10,923,322 | B2 | 2/2021 | Lopez et al. | |
| 2002/0020052 | A1 * | 2/2002 | Ito | H01F 17/045<br>29/606 |
| 2010/0164665 | A1 * | 7/2010 | Sevakivi | H01F 5/00<br>336/61 |
| 2010/0271161 | A1 | 10/2010 | Yan et al. | |
| 2010/0277267 | A1 | 11/2010 | Bogert et al. | |
| 2011/0205008 | A1 * | 8/2011 | Brennan | H01F 27/2847<br>336/221 |
| 2018/0033543 | A1 * | 2/2018 | Ohtsubo | H01F 27/2828 |
| 2018/0366301 | A1 * | 12/2018 | Lopez | H01F 27/40 |
| 2019/0198226 | A1 * | 6/2019 | Kawamura | H01F 27/29 |
| 2020/0234860 | A1 * | 7/2020 | Kusuda | H01F 5/00 |
| 2021/0020352 | A1 * | 1/2021 | Okano | H01F 27/303 |
| 2021/0057151 | A1 | 2/2021 | Sasaki et al. | |

FOREIGN PATENT DOCUMENTS

| | | | |
|---|---|---|---|
| DE | 102019103895 | A1 | 8/2020 |
| JP | S55167612 | U | 12/1980 |
| JP | H01266705 | A | 10/1989 |
| JP | H1197270 | A | 4/1999 |
| JP | 2000323343 | A | 11/2000 |
| JP | 2004179551 | A | 6/2004 |
| JP | 2006287678 | A | 10/2006 |
| JP | 2012526384 | A | 10/2012 |
| JP | 2013222895 | A | 10/2013 |
| JP | 2016067088 | A | 4/2016 |
| JP | 2019213324 | A | 12/2019 |
| KR | 20020010782 | A | 2/2002 |
| KR | 20020036092 | A | 5/2002 |
| KR | 20170046008 | A | 4/2017 |
| KR | 20180136379 | A | 12/2018 |
| WO | 2018159333 | A1 | 9/2018 |

* cited by examiner

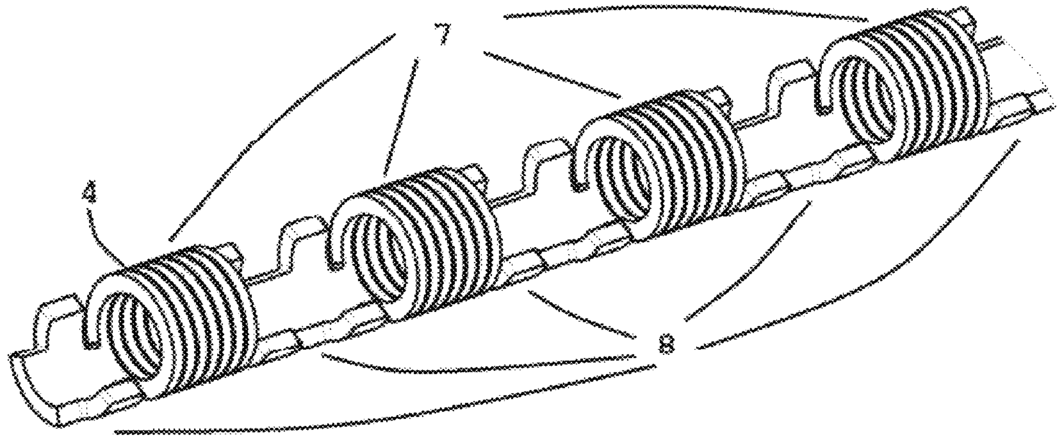
Fig. 2
Fig. 3
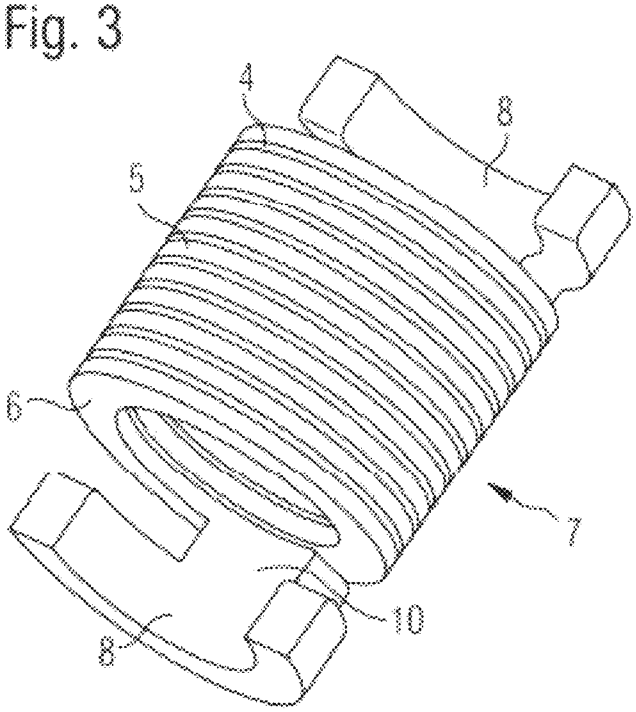

COIL AND METHOD OF MANUFACTURING THE COIL

This patent application is a national phase filing under section 371 of PCT/EP2021/059038, filed Apr. 7, 2021, which claims the priority of German patent application 102020110850.8, filed Apr. 21, 2020, each of which is incorporated herein by reference in its entirety.

TECHNICAL FIELD

The invention relates to a coil comprising a tube of conductive material and a method of manufacturing the coil.

BACKGROUND

In the course of miniaturization of electrical circuits, it is of high interest to provide small inductive components which have low power dissipation, high current carrying capacity and reliable, long service life.

Especially with wire coils, a weak point can be the connection of the wire to a contact element, which is needed for external contacting. The connection, which is usually realized with welded or soldered joints, can have at least a slightly increased resistance due to the alloy used, which contains copper, tin or nickel, or due to contamination with oxygen. If the contacts are not properly made, the resistance can also be considerably increased. This can result in high contact resistance, which causes high power dissipation. This can also result in increased thermal stress at this point, which in harmless cases can lead to coil failure or in more serious cases to a fire.

Particularly in the case of small coils, the design of the contacting and the lead-in of the coils has a serious effect on the electrical properties of the coil. The large ratio of the dimensions of the leads to the dimensions of the coil has a considerable effect on properties of the coil as an electronic component.

SUMMARY

Embodiments provide a coil with improved properties. Further embodiments provide a manufacturing method for a coil.

A coil is proposed comprising a tube having a tube wall of an electrically conductive material, the tube having an inductive portion in which a gap is arranged in the tube wall wherein the gap forms the tube wall in the inductive portion into a helix, and the tube has at least one contact section comprising a connection region and at least one terminal region, the connection region having the same contour as an adjacent portion of the helix, and the terminal region forms an electrical terminal of the coil, the connection region electrically connecting the terminal region to the inductive portion.

A tube may be defined as an elongated hollow body having an opening extending from a first end of the body throughout the body to a second end opposite the first end. The tube may be symmetrical about its longitudinal axis, the longitudinal axis extending from the center of a base surface at the first end to the center of a base surface at the second end. In one embodiment, the tube may have a circular, oval, or rectangular cross-section. However, other cross-sections are also possible.

A helical structure may be referred to as a helix. In particular, the helix may form turns of the coil.

The tube may in particular have a helical gap in the tube wall, whereby the turns of the coil are formed from the tube. The tube is formed of a conductive material. By a conductive material is meant materials with a conductivity of more than $10^4$ S/m, but in particular materials with a conductivity of more than $10^5$ S/m or more than $10^6$ S/m. Materials with a very high conductivity, for example metals such as copper, aluminum, silver or gold may be suitable. Also suitable as a starting material for the tube may be industrial steels such as carbon steel, stainless steel, alloy steel, or tool steel.

The tube has the inductive portion and at least one contact section. The inductive portion may form an inductance by the helix formed by the gap. The inductive portion and the contact sections are integrally formed from a material of the tube wall. Thus, no connecting partners such as solder are required to connect the inductive portion to the contact section. Rather, the inductive portion and the contact section can be formed by appropriately structuring the tube wall, while remaining connected to each other through the tube material.

The coil has the advantage that no internal connection points are required to connect an inductance to a terminal. Rather, the inductive portion and the contact section can be integrally formed. The coil has a lower overall resistance than a coil in which internal connection points are required to connect an inductance to a terminal. In addition, the elimination of internal contacts also eliminates the thermal as well as mechanical stress that would otherwise occur at the possible internal contacts, thereby reducing the coil's susceptibility to failure.

For this purpose, the tube need not be round in cross-section, but can be, for example, oval, square, rectangular, polygonal, square with rounded corners, rectangular with rounded corners, or polygonal with rounded corners. A square cross-section offers the advantage of optimum utilization of an available installation space for a given height or width.

Depending on the intended application for the coil, the base area of the tube may be planar, i.e., the extensions of the tube spanning the base area may be large compared to the extension into a height, and the height may be small. Or the tube may have a small base area with a substantial height. For example, if the coil is installed on a circuit board mounted in a narrow housing, a planar and flat shape may be advantageous. On the other hand, if little space can be provided on the circuit board itself, a tubular shape may be advantageous, having a small base area but appreciable height.

The connection region has the same contour as the adjacent area of the winding. Therefore, deformation of the connection region, which would be transferred to the directly connected helix, can be dispensed with. By a deformation is meant, in particular, bending and embossing. Such an application of force on the connection region acts directly as a bending moment on the inductive portion and leads to a deformation of the helix. The pitch of the helix, by which is meant the regularity of the turns and the gaps in the helix, can deteriorate even if a small amount of force is applied to the connection region. For example, this can cause a helix to have a smaller gap width on one side and a larger gap width on the opposite side. A stronger force effect in the connection region can also easily cause a short circuit in the helix, since turns of the helix, especially those close to the connection region, can be bent together and then touch each other.

Contour refers to an external shape that the region or section of the helix has, as viewed in a direction parallel to the longitudinal axis of the tube. For example, if the tube is quadrangular and the connection region is on a straight side of the quadrangle, the connection region is also straight. If the adjacent portion of the helix has a corner, the contour of the corner will also be present in the connection region. Accordingly, in the case of a round tube, the connection region has the contour of a segment of a circle. An adjacent section of the helix and the connection region, which have the same contour, can in particular be arranged parallel to one another.

A transition from the connection region to the inductive portion may be straight in a direction of a longitudinal axis of the tube. By eliminating a kink or angle between the connection region and the inductive portion, weakening of the material at this point can be avoided, thereby preventing breakage. Furthermore, a straight transition avoids a change in path or curvature of a flowing current, thus avoiding unplanned inductances in the coil.

Preferably, the inductive portion may have no deformation. Since the connection region has the same contour as the adjacent portion of the helix, deformation of the connection region and thus application of force to the connection region can be avoided. The application of a force to the connection region, which also leads to a deformation of the connection region, can easily lead to deformations within the helix. Even a small deformation of the inductive portion can lead to changes in the pitch, which characterizes the ratio of helix to gap as well as the regularity of the turns of the helix, and to variations in the electrical properties of the coil, which means that it no longer meets the planned requirements. Stronger deformations can press individual turns of the helix to each other, and thus even lead to a short circuit in the coil. A short circuit between two turns does not necessarily lead to a non-functional coil, but the shorted turn would not contribute to the inductance of the coil without a current flowing through it.

Furthermore, the terminal region can be formed by deforming the tube wall. In this way, an integral construction of the coil from the terminal region up to and including the inductive portion can be realized and a serial resistance of the coil can be kept low.

The terminal region and the connection region may be in a plane perpendicular to a longitudinal axis of the tube. Terminal regions arranged in this manner do not extend the dimensions of the entire coil, since the terminal region does not follow to the connection region in the direction of the longitudinal axis of the tube. The overall coil length can thus be kept short relative to the helix and a favorable form factor for the coil can be obtained.

Moreover, the terminal region may have a flat surface forming a solderable terminal. Accordingly, the coil may be particularly configured to be soldered to a conductor path, for example, of a printed circuit board.

The inductive portion may be spaced from a support surface by a part of the terminal region. This has the advantage of mechanically and thermally isolating the inductive portion from a support surface on which the coil is mounted. Thus, transfers of vibration from the coil or of heat to a mounting surface, such as a printed circuit board, are inhibited. Also, the magnetic field of the coil is less affected by a spaced mounting surface, giving the coil electrical properties as expected. In one embodiment, wherein the coil may be surrounded by or embedded in a magnetic material, spacing the coil from a mounting surface ensures that sufficient magnetic material can also be disposed between the coil and the mounting surface. In this way, the coil can be uniformly enveloped by the magnetic material, whereby a uniform magnetic field can be generated around the coil and the coil is additionally protected from all sides.

Spacing of the inductive portion can be accomplished, for example, by L-shaped terminal regions. A vertical part of the L-shaped terminal region acts as a spacer and a horizontal part can be the flat surface for electrical terminal. The vertical part of the terminal region spaces the inductive portion of the coil from a mounting surface, such as a printed circuit board, to which the coil may be electrically connected via the horizontal part.

Further, the coil may include a magnetic core. Use of, for example, a ferromagnetic core may provide higher magnetic flux density in the coil and increased inductance of the coil. Suitable materials for the core can be the metals nickel zinc, manganese zinc and cobalt, as well as other alloys. In this regard, the core is not limited to cores disposed exclusively within the interior of the coil, but also includes cores that form the core integrally as part of a modular coil housing. The embodiment of a coil with a modular coil housing may improve the electromagnetic compatibility of the coil. For example, by using an EP core as the housing, the electromagnetic shielding provided by the housing can be improved, especially for high frequency applications, thereby increasing the electromagnetic compatibility.

Furthermore, the tube can be embedded in a plastic to protect the tube mainly against mechanical but also against temperature and chemical influences. Suitable plastics include epoxy resin, phenyl resin and also silicones. By embedding the tube in a plastic, the coil component is more suitable for assembly with the aid of an automatic placement machine, for example in a pick-and-place process.

Powder with magnetic properties, such as iron powder, or magnetic nanoparticles may be mixed into the plastic. With the addition of magnetic particles into the plastic, the inductance of the coil can be increased and the electrical properties can be improved. The inductance can be adjusted via the proportion of magnetic particles in the plastic. The coil can further have a magnetic core even when embedded in a plastic, regardless of whether the plastic has a proportion of magnetic powder, to increase the inductance of the coil. By embedding the coil in a plastic, in particular in a plastic having a proportion of a powder with magnetic properties, the electromagnetic shielding of the component can be improved, especially also in high-frequency applications, and the electromagnetic compatibility can be increased.

Furthermore, the coil may have an outer diameter of 0.2 to 50 mm. Preferably, the outer diameter of the coil can be in the range of 0.5 to 20 mm. This size is particularly suitable for providing coils suitable for applications on a printed circuit board. The outer diameter should not be smaller than 0.2 mm, preferably not smaller than 0.5 mm, since otherwise such a small coil would be produced that automatic parts handling would be associated with considerable technical difficulties. The outer diameter should not be greater than 50 mm, preferably not greater than 20 mm, since otherwise the production of the coil from a tube would appear to be uneconomical.

Another aspect of the present application relates to a module comprising at least two coils. The coils may in particular be the coils described above. The at least two coils are arranged in a common housing. The housing may be formed by a plastic in which both coils are embedded. The two coils can be arranged spatially parallel to each other.

Preferably, the coils are arranged in such a way that the coils can be contacted electrically individually and are not interconnected in the module. In an alternative embodiment, the coils can be electrically connected in parallel or in series with each other to give the entire module a desired inductance. In this manner, it is possible to assemble a module from a plurality of coils such that the entire module has a higher or lower inductance than the individual coils.

The use of the module can shorten an assembly of a printed circuit board with a plurality of coils, resulting in a reduction of cycle time in a manufacturing process. By mounting the module, rather than a plurality of individual coils, only one module, rather than a plurality of individual coils, needs to be positioned on the printed circuit board during assembly of the coils, for example with a pick-and-place machine. The module can thus simplify a subsequent process in which the module is installed.

In addition, space is saved by arranging multiple coils within a module, compared to arranging multiple individual coils side-by-side. In applications where an available space is very limited, for example, a printed circuit board for a mobile device such as a smartphone, this space saving can be a significant advantage. Furthermore, housing material can be saved when the module is used instead of individually embedded coils.

Another aspect of the present application relates to a method of manufacturing a coil. In particular, the coil may be the coil previously described.

The method comprises the steps of:

a. Providing a tube having a tube wall of an electrically conductive material, and
b. Creating a gap in an inductive portion of the tube, the gap in the inductive portion forming the tube wall into a helix, and forming at least two sections of the tube into contact sections,
c. Deforming a first part of the contact sections into at least one terminal region each, a second part of the contact sections retaining the shape of the tube wall and forming a connection region, the connection region electrically connecting the terminal region to the inductive portion.

In this regard, the inductance of the inductive portion may be created only by creating the gap. The gap may be a cutting gap created by a laser. The shape of the contact section can also be created with a laser, in particular in a laser process together with the creation of the gap.

A laser process is suitable for creating the gap in the inductive portions, but also for creating a recess in the contact sections of the tube. The laser process has the advantage of being flexible to use and fast. In addition, the laser process has the advantage of not creating any mechanical stress, since it works without contact and leaves few residues. Other alternatives to create the gap can be, for example, a milling process, a sawing process or water jet cutting.

The above step b. may have a further sub-step, wherein a recess is formed in the contact section of the tube by removing an area of the tube wall. The recess in the contact section of the tube and the gap in the inductive portion may be created together in a single process step. Accordingly, the entire step b. can be created in a single process step, for example by laser cutting.

Furthermore, in step c., the terminal region can be formed by deforming the first part of the contact section in a direction perpendicular to the longitudinal axis of the tube. Since the terminal region is not deformed in a direction of the longitudinal axis of the tube, deforming the terminal region in the direction perpendicular to the longitudinal axis does not elongate the coil. By having a terminal region that predominantly expands in a direction perpendicular to the longitudinal axis of a tube, it is possible to avoid increasing the length of the entire coil too much compared to the length of the inductive portion or the helix.

Further, in step c., a first part can be formed from the contact sections into a terminal region by a stamping process. Forming, such as bending or stamping, using a stamping process is efficient, reliable and reproducible.

A second part of the contact sections, which can become the connection region by the stamping process, can be supported by a counter punch or a support surface during the stamping process so that no bending forces act on the second part during the stamping process. The counter punch can be shape-matched to the contour or outer shape of the tube. Since no bending moment acts on the connection region, the connection region retains the contour of the tube wall from which it is formed and is therefore the same as the contour of the adjacent inductive portion. The application of force to the inductive portion, which would lead to undesirable deformation of the inductive portion, is also avoided. Even a minor deformation of the inductive portion can cause a change in the electrical properties of the coil. A larger force applied to the connection region may even cause a short circuit in the inductive portion by causing two adjacent windings of the helix to contact each other as a result of the force applied. By eliminating the need for a bending moment in the connection region, the electrical properties of a coil produced by the above process become more reproducible and predictable.

In addition, in step b., a coil string can first be created by creating a plurality of inductive portions along the tube, in each of which a gap is created that forms the tube wall into a helix in the respective inductive portion, and a contact section is formed between each two inductive portions. In step c., a first part of the contact sections may be formed into at least one terminal region, respectively, and a second part of the contact sections may retain the shape of the tube wall and form a connection region, the connection region electrically connecting the terminal region to the inductive portion.

Such a coil string can optimize handling of the coils in production. For example, multiple coils can be processed simultaneously, which in turn can reduce cycle time in production. In addition, material can be saved by creating several inductive portions in one tube.

In addition, the terminal region can be formed by deforming the tube wall in a direction perpendicular to the longitudinal axis of the tube. A deformation of the tube wall to form a terminal region in a direction perpendicular to the longitudinal axis of the tube allows a terminal region to be formed without causing a change in the length of the coil string, whether elongation or compression. Deformation in a direction parallel to the longitudinal axis would inevitably result in a change in the length of the coil string. Therefore, a coil string formed in this way retains its defined overall length, despite the forming process for the terminal region. Handling of the coil strings is improved because the same dimensions and thus general conditions can be assumed in the process line in different manufacturing steps. Especially in the manufacturing process, a constant length of the coil strings over the entire production is advantageous, because in different production steps, such as the separation of the coil string, no additional dimensioning or a new input of the general conditions is necessary.

In addition, in the further step d., a separation of the coil string perpendicular to the longitudinal axis of the tube between two inductive portions can take place. A coil string can thus be subsequently separated into several coils. The coils can be split individually so that only one inductive portion with two adjacent contact sections is generated in each case. However, it is also possible to separate several inductive portions, each held together by a contact section, from the coil string to form a suitable overall coil consisting of several individual coils.

Multiple coils or coil strings can be embedded in plastic to form a package. The coils or coil strings may already have a magnetic core at this point. In this case, it is advantageous to arrange the coil strings parallel to each other before embedding. By embedding several coil strings at the same time, rather than individually, the manufacturing process can be accelerated. The plastic protects the coils from mechanical as well as temperature and chemical influences. Powder with magnetic properties or magnetic nanoparticles can also be mixed into the plastic. With the addition of magnetic particles into the plastic, the inductance of the coil can be increased and also adjusted via proportion of magnetic particles in the plastic.

It may be advantageous to arrange magnetic cores in the coil strings or the coils. This can increase the inductance of the coils or coil strings. In addition, arranging the cores in the coil strings before embedding them in a plastic enables the production of coils with a magnetic core embedded in a plastic that may also have magnetic components. This can increase the inductance and electromagnetic compatibility of the coils.

After embedding several parallel coil strings in a package, the coils can be separated transversely and parallel to the longitudinal axis of the coil strings. Here, it is advantageous to guide the separation line through the contact sections of the coils. This separates the package into individual coils. It is possible both to separate the package first transversely and then parallel and to separate the package first parallel and then transversely.

Another aspect relates to a method for manufacturing a module. In this case, the package, which has a plurality of coil strings arranged in parallel, can be separated transversely with respect to the longitudinal axis of the strings. Also in this option, it is advantageous to guide the separation line through the contact sections of the coils. There is no separation into individual coils parallel to the axis.

The module has at least two coils in a common housing, the tube having a contact section divided into a connection region and a terminal region. The method of manufacturing the module has the following steps:

- Creating at least two coil strings by creating a plurality of inductive portions along each of the tubes, in each of which a gap is created that forms the tube wall into a helix in the respective inductive portion, and wherein a contact section is formed between each two inductive portions, and wherein a first part of the contact sections is formed into at least one terminal region, respectively, and wherein a second part of the contact sections retains the shape of the tube wall and forms a connection region, the connection region electrically connecting the terminal region to the inductive portion,
- arranging the coil strings in parallel,
- embedding the coil strings in a plastic forming the housing, and
- separating the coil strings connected by the plastic along separation lines that are transverse to a longitudinal axis of the coil strings to form the module.

BRIEF DESCRIPTION OF THE DRAWINGS

In the following, the invention is described in more detail with reference to schematic illustrations of embodiments.

FIG. 2 shows a three-dimensional representation of a coil string;

FIG. 3 shows a three-dimensional representation of an intermediate product in the manufacture of a coil from the coil string;

Identical elements, similar elements or apparently identical elements are given the same reference signs in the figures. The figures and the size relationships in the figures are not to scale.

DETAILED DESCRIPTION OF ILLUSTRATIVE EMBODIMENTS

Figure 1A:
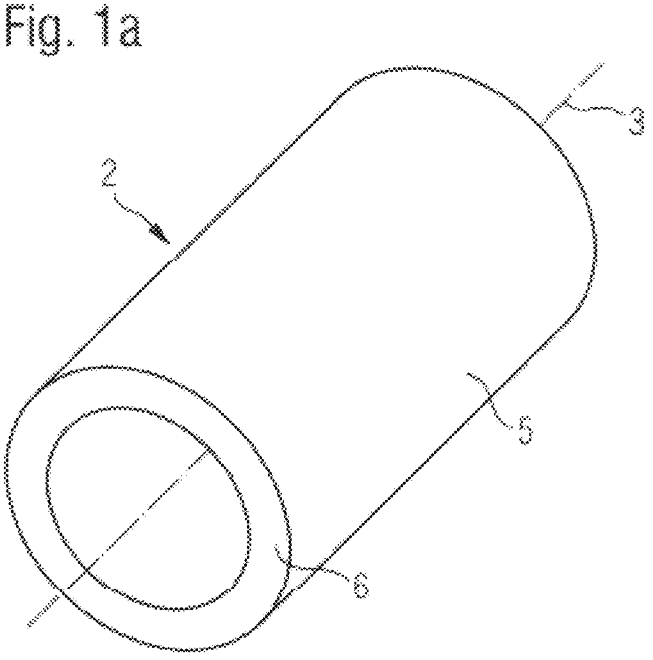
FIG. 1*a* shows a three-dimensional representation of a possible embodiment of a tube.
Figure 1B:
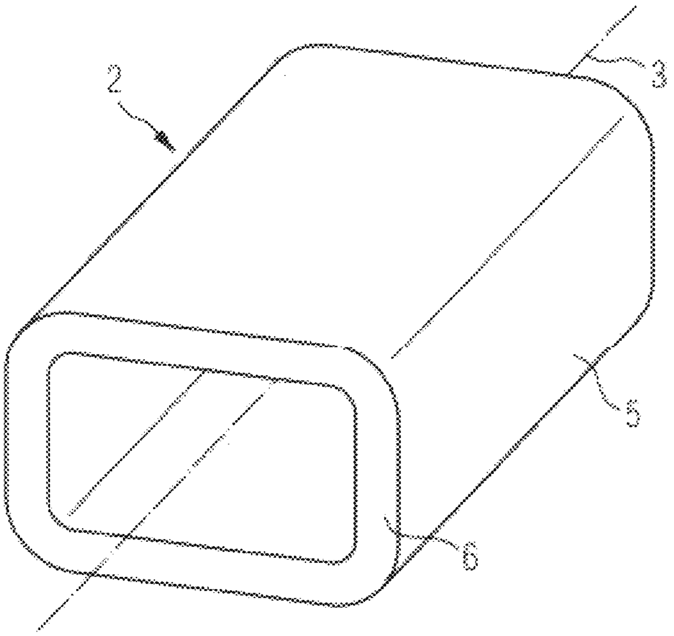
FIG. 1*b* shows a three-dimensional representation of a possible second embodiment of a tube.

In FIGS. 1*a* and 1*b*, a tube 2 is shown with a round and a rounded square cross-sectional area, respectively. A tube 2 is an elongated hollow body having an opening extending from a first end of the body throughout the body to a second end opposite the first end. The tube 2 may be symmetrical about its longitudinal axis 3, the longitudinal axis 3 extending from the center of the base surface at the first end to the center of the base surface of the second end. In one embodiment, the tube 2 may have a circular, oval, rectangular or polygonal cross-sectional area. Other cross-sections are also possible.

The tube 2 may have an outer diameter of 0.2 to 50 mm. Preferably, the outer diameter of the tube 2 may be in the range of 0.5 to 20 mm. This size is particularly suitable for producing coils 1 suitable for applications on a printed circuit board. The tube wall 6, whose thickness is determined by the distance between the inner radius to the outer radius of the tube 2, can vary greatly depending on the tube 2 used, although a thickness of less than 1 mm can be advantageous for machining. Along the outer radius in the direction of the longitudinal axis 3, the mantle surface 5 of the tube 2 extends. The tube 2 consists of a primarily electrically conductive material.

The tube 2 constitutes a starting material used in the manufacturing of a coil 1. In the course of the manufacturing process, the tube 2 shown in FIG. 1*a* can first be structured into a coil string. FIG. 2 shows the coil string. In particular, the tube 2 can be structured by a laser process in which inductive portions 7 and contact sections 8 are formed in the tube 2. The inductive portions 7 and the contact sections 8 alternate along the tube 2.

A gap 4 is created in the inductive portions 7, which penetrates a tube wall 6 and forms the tube wall 6 into a helix. As a result, an inductance of the inductive portions 7 is formed. During the manufacturing process, the contact sections 8 are partially formed into a terminal region 11, with another part of the contact section becoming a connection region 10. A recess is formed in the contact sections 8 during the structuring of the tube 2, wherein a part of the tube wall 6 is removed.

The coil string optimizes the handling of the coils 1 in production. Thus, several coils 1 can be handled simultaneously, which leads to a reduction in cycle time in production. In addition, material can be saved by creating multiple inductive portions 7 in a tube 2.

The inductive portions 7 are integrally connected by the contact sections 8 and have no unnecessary transition resistances between each other.

The different inductive portions 7 of the coil string can have different or the same inductances. Thus, it is possible to produce different coils 1 from one tube 2, each of which can be varied in inductance and is therefore suitable for a wide variety of applications. The inductances can be varied, for example, by the number of turns formed with the gap 4 or with the spacing of the gaps 4 in the direction of the longitudinal axis 3 after one revolution around the tube 2, which corresponds to the width of the turns. In the embodiment example of FIG. 2, the gaps 4 shown are the same and consequently the inductance of each inductive portion 7 is the same.

In FIG. 3, a three-dimensional representation of an intermediate product in the manufacture of a coil 1 from the coil string is shown. The coil string has been singulated along separation lines 12 extending transversely to the longitudinal axis 3 of the coil string.

The coil 1 has a tube 2 of electrically conductive material, wherein a gap 4 extending along a shell surface 5 and around the longitudinal axis 3 of the tube 2 has been created to form an inductive portion 7. In an alternative embodiment, the entire tube 2 may be structured to provide only a single inductive portion 7 and two contact sections 8 adjacent thereto. Accordingly, the tube 2 may be structured to form the intermediate product shown in FIG. 3, wherein the tube 2 is cut to a suitable length. The contact section 8 and the inductive portion 7 are directly connected to each other. The contact section 8 and the inductive portion 7 are integrally and integrally formed from the structured tube wall 6.

Figure 4:
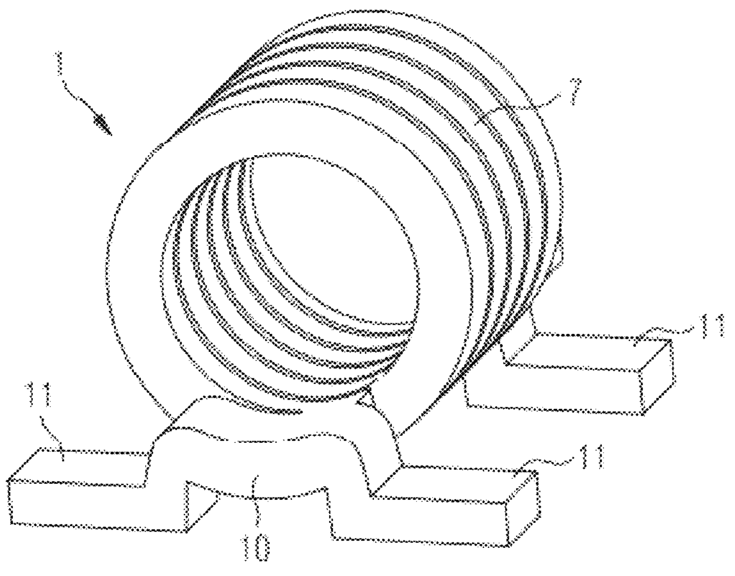
FIG. 4 shows a three-dimensional representation of a coil according to one embodiment of the invention.

FIG. 4 shows the coil 1 after a stamping process has been used to bend a first part of the contact sections into two terminal regions 11 each, with an undeformed second part of the contact sections forming the connection region 10. For the purpose, the second part of the contact sections was supported during the stamping process by a counter punch or a supporting surface in order not to allow any bending forces or moments to act on the second part during the stamping process. Preferably, the counter punch is form-fitted to the contour or outer shape of the tube 2. Due to the lack of bending moment on the connection region 10, the connection region 10 remains unchanged and has the same contour of the tube wall 6 as the contour of the adjacent inductive portion.

Since, with the help of the counter punch, the force effect of the stamping process in the connection region 10 is neutralized during the forming of the first part of the contact sections to the terminal region 11, there is also no bending moment acting on the adjacent helix. Thus, the helix retains its shape and pitch, and possible short circuits between adjacent turns can also be eliminated.

In the embodiment shown in FIG. 4, the connection region 10 has the shape of a segment of a circle, since the tube 2 from which the coil 1 has been made is circular. Thus, in an embodiment in which the tube 2 has a square basic shape, the connection region 10 could have a straight contour, for example. However, this does not limit the shape of the connection region 10. Rather, the connection region 10 may have any shape and contour similar to that of the tube 2 in an adjacent section.

The terminal region 11 in FIG. 4 was formed by a deformation of the tube wall 6, in a direction perpendicular to the longitudinal axis 3 of the tube 2. Deformation to form a terminal region 11 in a direction perpendicular to the longitudinal axis 3 of the tube 2 allows the terminal region 11 to be formed without causing a change in the length of the coil string, whether elongation or compression. Deformation in a direction parallel to longitudinal axis 3 would inevitably result in a change in the length of the coil string. For example, if the terminal region 11 were formed in the direction of the longitudinal axis 3 of the tube 2 (i.e., out of view in FIG. 4), a coil string having a plurality of such sections would be shortened due to the deformation. If, on the other hand, the terminal region 11 is bent over perpendicular to the longitudinal axis 3 of the tube 2, a coil string formed in this way will retain its defined overall length, despite the forming process for the terminal region 11. In this respect, the handling of the coil strings is improved, especially in the manufacturing process, because the same dimensions and the associated general conditions, such as the position of the inductive portions, can be assumed in the process line in various manufacturing steps. When separating the coil string, for example, a central cut between two inductive portions can be made automatically and without further measurements.

Another advantage of arranging the terminal regions 11 perpendicular to the longitudinal axis 3 of the tube 2 is that the overall coil length can be kept short, especially compared to the length of the helix, in order to achieve a better form factor for the coil 1.

Furthermore, the inductive portion, which is L-shaped in the embodiment example shown in FIG. 4, is spaced from the supporting surface by a part of the terminal region 11. In this way, the inductive portion is mechanically and thermally isolated from a support surface. Thus, transmissions of vibrations of the coil 1 or of heat to a supporting surface, which may be a printed circuit board, for example, are inhibited. In addition, the distance between the inductive portion 7 and a support surface ensures that sufficient space is provided to embed the inductive portion completely in a plastic 9. Also, the magnetic field of the coil 1, and thus the inductance, is less affected by a spaced support surface.

Figure 7:
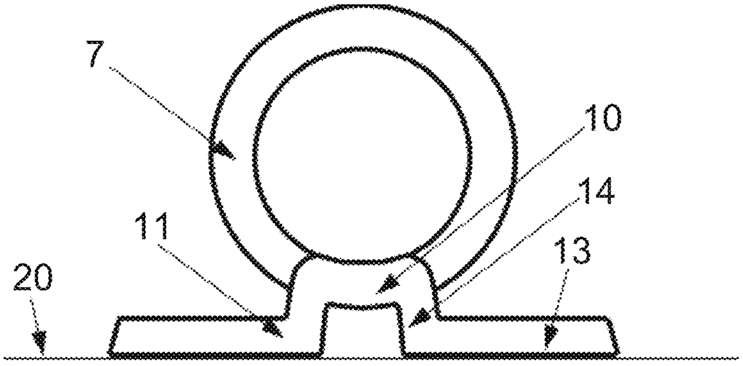
FIG. 7 is a front side view of the coil of FIG. 4.

The L-shaped terminal region 11 has a horizontal portion 13 and a vertical portion 14 as shown in FIGS. 4 and 7. The horizontal portion 13 forms a flat surface that forms a solderable terminal. The inductive portion 7 is spaced apart from a support surface 20 by the vertical portion 14. Accordingly, it is possible to solder the coil 1 to a conductor path, for example of a printed circuit board. The integral formation of the coil 1 from the tube 2 makes it possible to dispense with additional connection techniques. For this reason, the coil 1 has a lower overall resistance, which in turn results in low power dissipation. In addition, the thermal load is also reduced, especially at possible contact points, which reduces the susceptibility of the coil 1 to faults.

Figure 5:
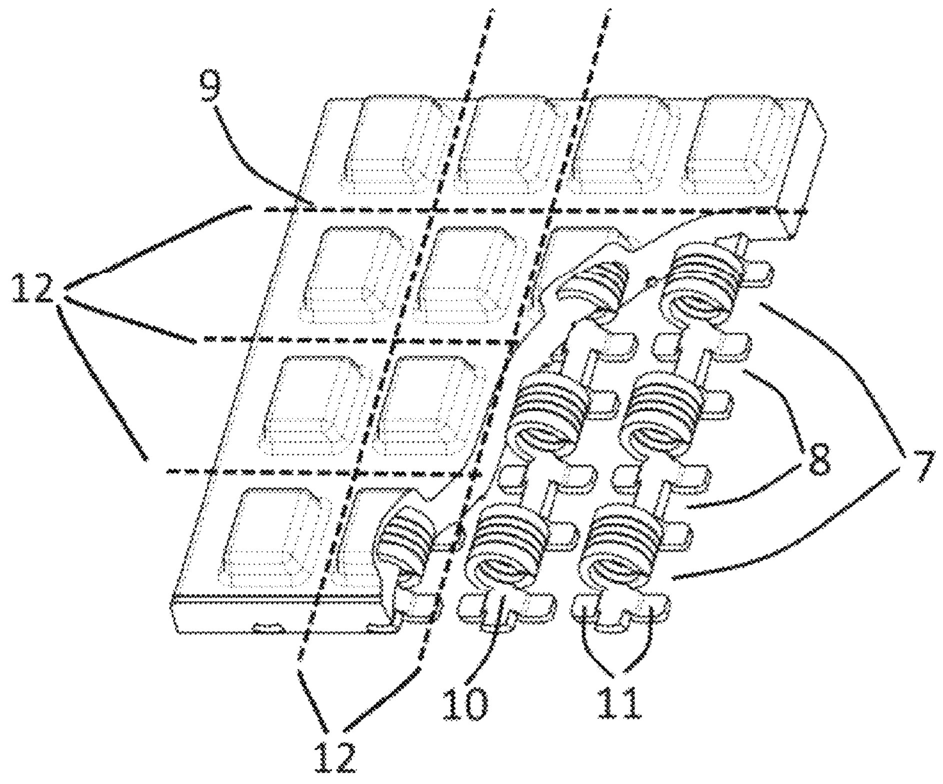
FIG. 5 shows a three-dimensional representation of multiple coil strings embedded in plastic to form a package.

In FIG. 5, four coil strings are embedded in plastic 9, with the longitudinal axes 3 of the coils 1 arranged parallel to each other. Such an arrangement is also called a package. The four coil strings here each have four inductive portions 7 and four contact sections 8. In the package shown in FIG. 7, this is only an example and more coil strings, and in particular more than 20 coil strings, with any other number of inductive portions 7 and contact sections 8 can be used. In this embodiment, the contact sections 8 have been opened by recesses and then stamped to form a non-deformed connection region 10 and two terminal regions 11. The dashed lines show several possible separation lines 12 for separation, which run transversely or parallel to the longitudinal axis 3 of the coils 1 and through the contact sections 8. Alternative embodiments are also conceivable in which separation occurs along any other number of separation lines 12. If the coil 1 is singulated parallel to the longitudinal axis 3 of the tube 2, the inductive portions 7 are connected in series. By embedding multiple coil strings simultaneously, rather than individually, the manufacturing process can be accelerated.

As a type of housing, the plastic 9 provides protection against possible hazards from the immediate environment. The protective function of the plastic can be pragmatically extended by adding particles with desired magnetic properties. The inductance can also be adjusted via the amount or concentration of magnetic particles in the plastic. In an alternative embodiment, a coil 1 could be connected to an EP core, with the EP core integrally also forming a housing. The EP core could comprise two halves, which can be bonded together. By means of an EP core, the coil 1 can be electromagnetically shielded, especially in high-frequency applications, and thus the electromagnetic compatibility of the component can be increased.

Creating a module, which has several coils 1 in a package, from a package is also easily possible. In this case, a package, as shown in FIG. 5, is separated parallel and/or perpendicular to the longitudinal axis 3 of the tube 2, as required. The package shown in FIG. 5 is only an example and much longer coil strings, with more coils 1, and a larger number of coil strings, can be arranged in the package.

The contact pads of a module itself can be contacted from below and, if necessary, from the side and can be contacted, for example, via solder pads or conductor paths via a soldering process or an adhesive process. The use of a module can lead to a reduction in cycle time during assembly of the coils 1. For example, by installing a module instead of individual coils 1, a pick-and-place machine only needs to position the component on a PCB once, instead of multiple times. Furthermore, by arranging multiple coils 1 within a module, space is saved compared to arranging multiple individual coils 1 side by side.

The coils 1 in the module may be intended to be connected together in parallel, in series, or not at all. In an embodiment in which multiple coils 1 are arranged side by side, each coil 1 may be contacted individually. If, on the other hand, such a module is contacted with two conductor paths running perpendicular to the longitudinal axis 3, the inductive portions 7 can be electrically connected in parallel with each other. If the conductor path is applied in a meandering manner under the module, the inductive portions 7 can be connected in series. Thus, the coils 1 themselves in a module can be interconnected in a variety of ways with each other but also within an electronic device.

Figure 6:
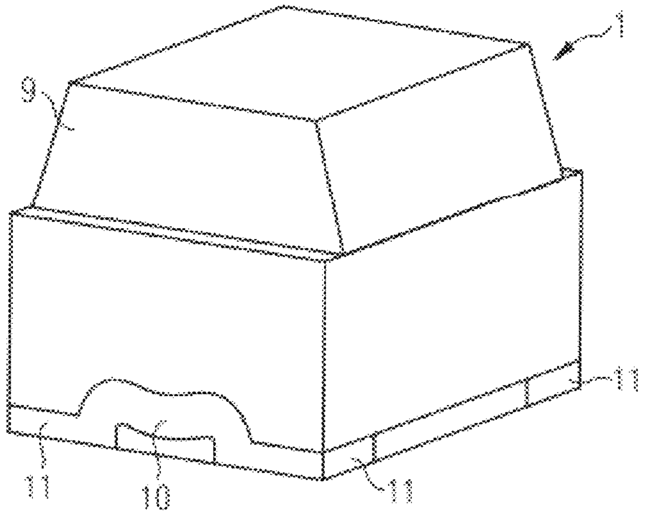
FIG. 6 shows a three-dimensional representation of a coil that has been embedded in plastic and is a single component ready for use.

FIG. 6 shows a single coil 1 which has been embedded in plastic 9. At the front of the embedded coil 1 is the contact section, which has a circle segment-shaped connection region 10 and two L-shaped terminal regions 11. The coil 1 may have been made either by separating the coils 1 from a package, or by embedding a single coil 1, as shown in FIG. 4, in plastic 9.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A coil comprising:

an inductive portion, wherein a helix is formed from a tube having a tube wall of an electrically conductive material by arranging a gap in the tube wall which shapes the tube wall in the inductive portion forming the helix; and two contact sections on opposite ends of the helix, each contact section comprising a connection region and a terminal region, wherein the connection region has the same contour as an adjacent portion of the helix, wherein the terminal region is an electrical terminal of the coil, wherein the connection region electrically connects the terminal region to the inductive portion, wherein the terminal region has two L-shaped regions on opposite sides of the connection region, each L-shaped region having a horizontal portion and a vertical portion, wherein the horizontal portion is a flat surface that is a solderable terminal, wherein the inductive portion is spaced apart from a support surface on which the coil is mountable by the vertical portion, and wherein the L-shaped regions are integrally formed from a material of the tube wall.

2. The coil according to claim 1, wherein a transition from the connection region to the inductive portion is straight in a direction of a longitudinal axis of the tube.

3. The coil according to claim 1, wherein the inductive portion has no deformation.

4. The coil according to claim 1, wherein the terminal region is formed by a deformation of the tube wall.

5. The coil according to claim 1, wherein the terminal region and the connection region are in a plane perpendicular to a longitudinal axis of the tube.

6. The coil according to claim 1, further comprising a core.

7. The coil according to claim 1, wherein the tube is embedded in a plastic.

8. The coil according to claim 7, wherein the plastic is mixed with magnetic powder, magnetic particles or other magnetic material.

9. A module comprising:

at least two coils according to claim 1 arranged in a common housing.

10. A method for manufacturing the coil of claim 1, the method comprising:

providing the tube;

creating the gap in the inductive portion of the tube, and forming at least two sections of the tube into the contact sections; and deforming a first part of the contact sections into the terminal region in each case, wherein a second part of the contact sections retains a shape of the tube wall and forms the connection region, the connection region electrically connecting the terminal region to the inductive portion.

11. The method according to claim 10, further comprising using a laser process to create the gap and to form the contact sections.

12. The method according to claim 10, further comprising forming a recess in the contact sections of the tube by removing a region of the tube wall.

13. The method according to claim 12, wherein the recess in the contact sections of the tube and the gap in the inductive portion are created together in a single process.

14. The method according to claim 10, wherein deforming the first part of the contact sections comprises forming the terminal region in each case by deforming the first part of the contact section in a direction perpendicular to a longitudinal axis of the tube.

15. The method according to claim 10, wherein deforming the first part of the contact sections comprises forming the first part of the contact sections into the terminal region by a stamping process with a counter punch.

16. The method according to claim 15, wherein the second part of the contact sections, which becomes the connection region by the stamping process, is supported by the counter punch during the stamping process so that no bending forces act on the second part during the stamping process.

17. The method according to claim 10, wherein creating the gap in the inductive portion of the tube comprises:

producing a coil string by generating along the tube a plurality of inductive portions in each of which the gap is generated which in the respective inductive portion forms the tube wall into the helix, and forming the contact section between each two inductive portions, and wherein deforming the first part of the contact sections comprises:

forming the first part of the contact sections into the terminal region in each case, wherein the second part of the contact sections retains the shape of the tube wall and forms the connection region, the connection region electrically connecting the terminal region to the inductive portion.

18. The method according to claim 17, wherein the terminal region is formed by deforming the tube wall in a direction perpendicular to a longitudinal axis of the tube.

19. The method according to claim 18, further comprising separating the coil string perpendicular to the longitudinal axis of the tube between the two inductive portions.

20. The method according to claim 17, further comprising creating a plurality of coil strings and embedding the plurality of coil strings into a plastic material, wherein the coil strings are arranged parallel to each other.

21. The method according to claim 20, further comprising separating the coil strings transversely and/or parallel to a longitudinal axis of the coil strings.

22. A method for producing modules, each module being the module according to claim 9, the method comprising:

producing at least two coil strings so that a plurality of inductive portions is produced along each of the tubes, in each of which the gap is produced, wherein a contact section is formed between each two inductive portions, wherein a first part of the contact section is formed into the terminal region in each case, and wherein a second part of the contact section retains a shape of the tube wall and forms the connection region;

arranging the coil strings in parallel;

embedding the coil strings in a plastic which forms the housing; and separating the coil strings connected by the plastic along separation lines perpendicular to a longitudinal axis of the coil strings and between the inductive portions to form the module.

23. A coil comprising:

an inductive portion, wherein a helix is formed from a tube having a tube wall of an electrically conductive material by arranging a gap in the tube wall which shapes the tube wall in the inductive portion forming the helix; and two contact sections on opposite ends of the helix, each contact section comprising a connection region and a terminal region, wherein the connection region has the same contour as an adjacent portion of the helix, wherein the terminal region is an electrical terminal of the coil, wherein the connection region electrically connects the terminal region to the inductive portion, wherein the terminal region has two L-shaped regions on opposite sides of the connection region, each L-shaped region having a horizontal portion and a vertical portion wherein the horizontal portion is a flat surface that is a solderable terminal, wherein the inductive portion is spaced apart from a support surface on which the coil is mountable by the vertical portion, and wherein the horizontal portions of the two L-shaped regions extend away from each other in a direction perpendicular to a longitudinal axis of the tube.

* * * * *